United States Patent
Khoruzhenko et al.

(10) Patent No.: US 11,269,606 B2
(45) Date of Patent: Mar. 8, 2022

(54) FIRMWARE PUBLICATION OF MULTIPLE BINARY IMAGES

(71) Applicant: Absolute Software Corporation, Vancouver (CA)

(72) Inventors: Eugene Khoruzhenko, Redmond, WA (US); Jeffrey Michael Bush, Austin, TX (US); Philip B Gardner, Woodbury, MN (US)

(73) Assignee: Absolute Software Corporation, Vancouver (CA)

( * ) Notice: Subject to any disclaimer, the term of this patent is extended or adjusted under 35 U.S.C. 154(b) by 46 days.

(21) Appl. No.: 16/769,185

(22) PCT Filed: Dec. 11, 2018

(86) PCT No.: PCT/CA2018/051575
§ 371 (c)(1),
(2) Date: Jun. 2, 2020

(87) PCT Pub. No.: WO2019/113686
PCT Pub. Date: Jun. 20, 2019

(65) Prior Publication Data
US 2021/0216296 A1 Jul. 15, 2021

Related U.S. Application Data

(60) Provisional application No. 62/598,319, filed on Dec. 13, 2017, provisional application No. 62/598,095, filed on Dec. 13, 2017.

(51) Int. Cl.
*G06F 9/24* (2006.01)
*G06F 9/445* (2018.01)
(Continued)

(52) U.S. Cl.
CPC .............. *G06F 8/61* (2013.01); *G06F 9/4401* (2013.01); *G06F 21/64* (2013.01); *G06F 8/4442* (2013.01);
(Continued)

(58) Field of Classification Search
CPC .......... G06F 8/61; G06F 8/654; G06F 8/4442; G06F 9/4401; G06F 9/45558;
(Continued)

(56) References Cited

U.S. PATENT DOCUMENTS

| 6,615,404 B1 | 9/2003 | Garfunkel |
| 9,612,846 B2 | 4/2017 | Puthillathe |

(Continued)

OTHER PUBLICATIONS

Christopher Kruegel et al., Detecting Kernel-Level Rootkits Through Binary Analysis, IEEE 2004, [Retrieved on Oct. 27, 2021]. Retrieved from the internet: <URL: https://ieeexplore.ieee.org/stamp/stamp.jsp?tp=&arnumber=1377219> 10 Pages (1-10) (Year: 2004).*

(Continued)

*Primary Examiner* — Anibal Rivera
(74) *Attorney, Agent, or Firm* — Damien G. Loveland

(57) ABSTRACT

Multiple binary images stored in the firmware of an electronic device are written to the device's configuration tables during booting of the device, where one of the binary images is a manager binary. During booting, the manager binary is saved to the file system of the operating system such that it automatically executes upon completion of booting. The manager binary then saves the other binary images to the OS file system, such that they also execute automatically.

11 Claims, 3 Drawing Sheets

(51) Int. Cl.
  *G06F 9/06* (2006.01)
  *G06F 21/57* (2013.01)
  *G06F 9/44* (2018.01)
  *G06F 8/61* (2018.01)
  *G06F 9/4401* (2018.01)
  *G06F 21/64* (2013.01)
  *G06F 9/451* (2018.01)
  *G06F 8/654* (2018.01)
  *G06F 9/455* (2018.01)
  *G06F 21/56* (2013.01)
  *G06F 8/41* (2018.01)

(52) U.S. Cl.
  CPC ............ *G06F 8/654* (2018.02); *G06F 9/4403* (2013.01); *G06F 9/4406* (2013.01); *G06F 9/4416* (2013.01); *G06F 9/452* (2018.02); *G06F 9/45558* (2013.01); *G06F 21/566* (2013.01); *G06F 21/57* (2013.01); *G06F 21/572* (2013.01)

(58) Field of Classification Search
  CPC ...... G06F 9/4406; G06F 9/4416; G06F 9/452; G06F 9/4403; G06F 21/64; G06F 21/572; G06F 21/57; G06F 21/566
  See application file for complete search history.

(56) References Cited

U.S. PATENT DOCUMENTS

| | | | |
|---|---|---|---|
| 9,721,101 | B2 | 8/2017 | Jones |
| 10,402,204 | B1* | 9/2019 | Yakovlev ............... G06F 3/0665 |
| 10,664,262 | B2* | 5/2020 | Zimmermann ....... G06F 21/563 |
| 10,740,109 | B2* | 8/2020 | Roszak ................. G06F 9/4406 |
| 2009/0327741 | A1 | 12/2009 | Zimmer |
| 2011/0131447 | A1 | 6/2011 | Prakesh |
| 2012/0124357 | A1* | 5/2012 | Zimmer .................... G06F 8/61 713/2 |
| 2015/0242221 | A1 | 8/2015 | Tsirkin |
| 2018/0276002 | A1* | 9/2018 | Roszak ................. G06F 9/4406 |
| 2019/0005058 | A1* | 1/2019 | Oganezov ............ G06F 16/172 |
| 2019/0065171 | A1* | 2/2019 | Zimmermann ......... G06F 21/57 |

OTHER PUBLICATIONS

Hoffman, 'Zombie Crapware: How the Windows Platform Binary Table Works', Aug. 19, 2015, downloaded from howtogeek.com on Mar. 20, 2018.
Xu, Herbert, 2016, git.kernel.org.
Ionescu, Alex, 'ACPI 5.0 Rootkit Attacks "Againts" Windows 8', SyScan 2012, Crowd Strike.
Windows Platform Binary Table (WPBT), Jun. 9, 2015, Microsoft.
Yosifovich et al., 'System Architecture, Processes, Threads, Memory Management and More', 2017, Microsoft.
Weksteen, 'ACPI Table Implants', Google.

* cited by examiner

FIRMWARE PUBLICATION OF MULTIPLE BINARY IMAGES

CROSS-REFERENCE TO RELATED APPLICATIONS

This application is a national stage entry of PCT/CA2018/051575 filed on Dec. 11, 2018, which claims priority from Provisional Application 62/598,095 filed on Dec. 13, 2017 and Provisional Application 62/598,319 filed on Dec. 13, 2017.

TECHNICAL FIELD

This application relates to the field of publishing binary images from firmware. In particular, it relates to the publishing of multiple binary images from firmware to an operating system environment.

BACKGROUND

The current implementation of Windows® Platform Binary Table (WPBT) allows for only one binary image to be published by firmware to Windows® for execution. The firmware builds tables of system information during boot, which are used by the operating system to determine, for example, what hardware is installed. One of the tables includes information about an executable embedded in the firmware. During boot, the operating system looks for this table, and, if present, copies the executable into the file system and runs it.

SUMMARY

The present invention permits a binary table, which is configured to hold information about a single publishable executable, to generate multiple published binaries during booting of an operating system. In particular, this document discloses an extension to WPBT that adds support for publishing more than one binary image by firmware for execution by Windows® and other operating systems. Using this extension, an OEM (Original Equipment Manufacturer) is able to include its own binary image alongside the image of the Absolute® Persistence® Agent or any other software agent. The end-customer then has the option to purchase client software that takes advantage of any, all or none of the agents or binary images listed within the extension.

DETAILED DESCRIPTION

A. Glossary

ABT—Absolute Software

ACPI—Advanced Configuration and Power Interface, an industry specification for the efficient handling of power consumption in desktop and mobile computers. ACPI specifies how a computer's basic input/output system, operating system, and peripheral devices communicate with each other regarding power usage. ACPI defines tables that provide the interface between an ACPI-compliant operating system and system firmware. The tables allow for the description of system hardware in a platform-independent manner, and are presented as either fixed-formatted data structures or in AML (ACPI Machine Language).

API—Application Programming Interface

BIOS—Basic Input/Output System. This is firmware used for hardware initialization during the booting process of an electronic device, and for providing runtime services for operating systems and programs.

DXE—Driver Execution Environment

FAT—File Allocation Table

NTFS—New Technology File System

OEM—Original Equipment Manufacturer

OS—Operating System

Platform Extension Manager—A Windows® native user-mode application (PlatExtMgr.exe, wpbbin.exe) that is pointed at by WBPT. The native user-mode application is built in an SDK as PlatExtMgr.exe. As it is published by WPBT, it becomes a binary buffer in memory with no name. When Windows® finds the WPBT and then this binary buffer, Windows® saves the buffer as file wpbbin.exe, as per Microsoft's WPBT specification. When run, this application finds XPBT tables and installs binaries referenced by those tables.

RSDT—Root System Description Table

SDK—Software Development Kit

SHA—Secure Hash Algorithm

UEFI—Unified Extensible Firmware Interface, a specification that defines a software interface between an operating system and platform firmware. The UEFI is stored as firmware in non-volatile memory.

WPBT—Windows Platform Binary Table

XPBT—Extended Platform Binary Table. An XPBT can accommodate multiple nodes.

XSDT—Extended System Description Table

B. Exemplary Embodiment

Figure 1:
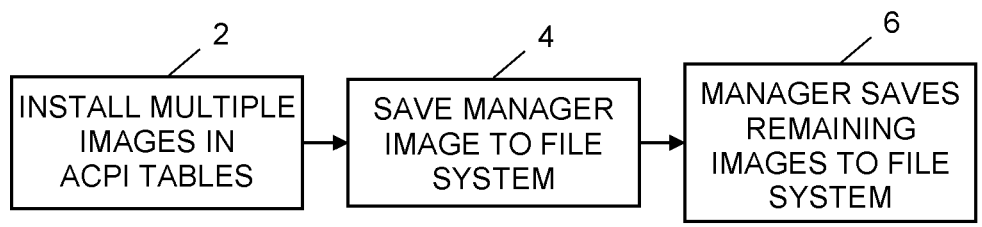
FIG. 1 is an overview of the main steps of the process for publishing multiple binaries, according to an embodiment of the present invention.

Referring to FIG. 1, the main steps in the process are shown in the form of a flowchart. In step 2, multiple binary images are installed in the ACPI tables during the booting of a computer, where one of the binary images is a manager binary. In step 4, still during booting, the manager binary is saved to the file system of the operating system. At some point, early in the loading process of the OS, the OS executes the manager binary, which saves the other binary images to the OS file system in step 6. A more detailed flowchart is described below.

Figure 2:
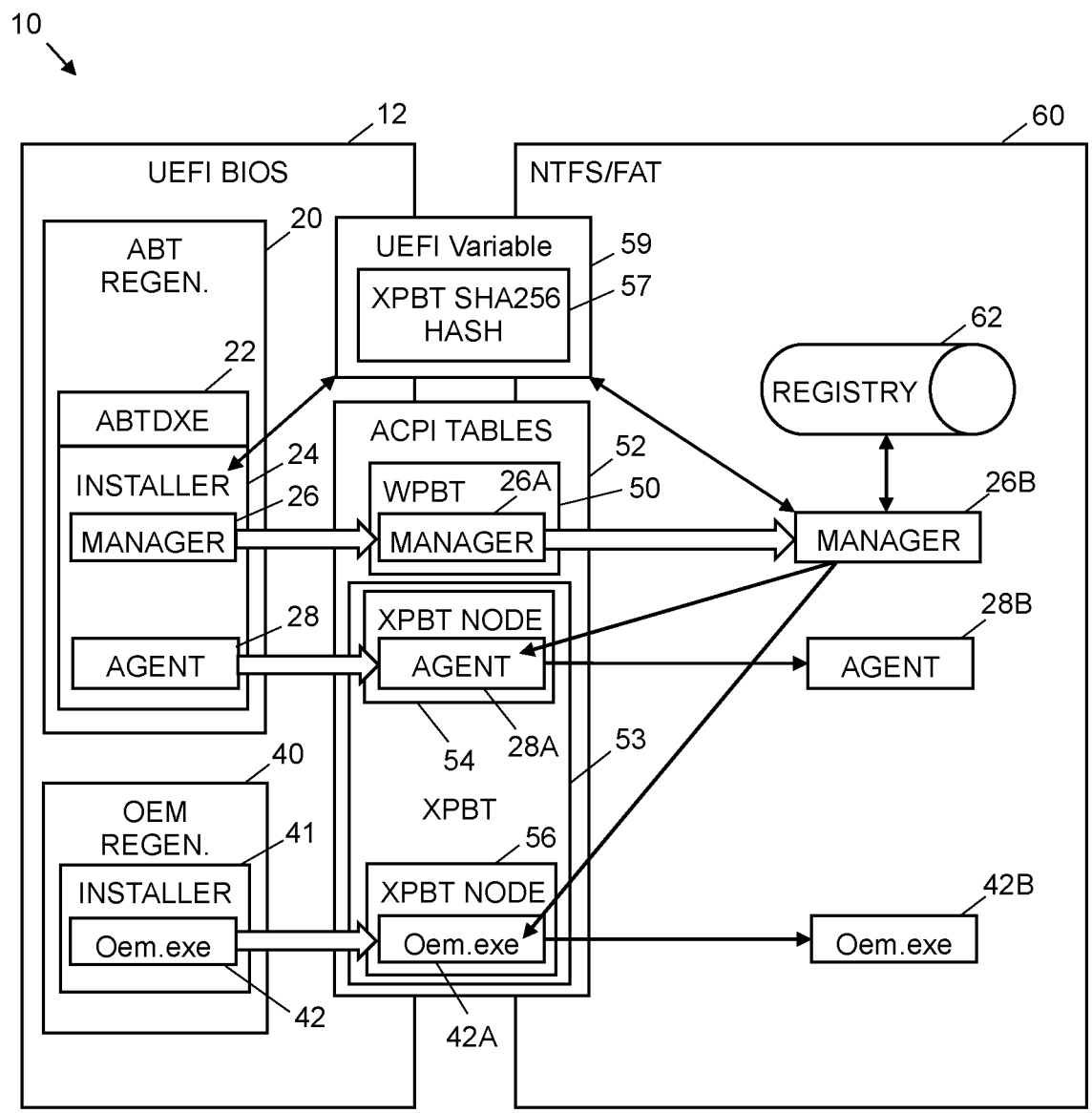
FIG. 2 is a schematic block diagram of a system showing the execution and code flow for publishing multiple binary images, according to an embodiment of the present invention.

Referring to FIG. 2, a system 10 is shown for publishing multiple binaries from firmware 12, such as UEFI BIOS, to the operating system of a computing device.

A first regenerative module, (e.g. ABT Persistence®) 20, is stored in the firmware 12. The regenerative module 20 includes a DXE driver, AbtDxe 22, which is a security module that is able to contact a server that is remote from the computing device. Also included in the regenerative module 20 is an installer 24 (AbtAgentInstaller), which itself includes a platform extension manager binary image 26 (PlatExtMgr.exe) and the agent 28 (AbtAgent). The driver 22 runs on booting of the device and triggers operation of the installer 24.

A second, OEM regenerative module 40 is also stored in the firmware 12. The OEM regenerative module 40 in turn includes a second installer 41 and binary Oem.exe 42. The OEM regenerative module 40 also runs automatically upon booting the device.

The manager binary image 26 is installed into WPBT 50 by the installer 24 (AbtAgentInstaller), where it is shown as a copy 26A of manager binary image 26.

The XPBT (Extended Platform Binary Table) 53, with XPBT node 54 for the OS agent 28A is created by the installer 24, along with the creation of the WPBT 50. All other XPBT nodes are created using separate OEM or third party installers that run in the UEFI BIOS 12. For example, there is one installer 24 in the ABT regenerative module 20 and another installer 41 in the OEM regenerative module 40. The ABT regenerative module 20 is required for the OEM regenerative module 40 to be able to install the Oem.exe agent. It is therefore possible for different entities to update and/or extend the XPBT 53 to insert their own respective portions.

During Windows® boot, the manager binary image 26A pointed at by WPBT is saved as a further copy 26B (wpbbin.exe) of the platform extension manager binary image 26 and is executed by Windows® as usual. No additional binary images can be executed by Windows® in this way.

Each valid XPBT payload binary, including the OS agent 28A and OEM agent Oem.exe 42A, is saved to the OS file system 60. The platform extension manager 26B checks to make sure that the payload binary 28A, 42A is for the particular OS, and verifies the integrity of the XPBT 53 before processing it. An XPBT SHA256 hash 57 of the XPBT 53 is calculated by the installer 24 in the UEFI BIOS 12 and saved in read-only UEFI variables 59, which the platform extension manager 26B reads to verify the integrity of the XPBT. The calculation of the hash 57 is triggered by the AbtDxe driver 22, after the various entities have inserted their particular XPBT nodes 54, 56 into the XPBT 53, so that the XPBT integrity can be verified later by the platform extension manager 26B.

An API is provided in the AbtDxe driver code that allows the various entities to insert their XPBT nodes 54, 56 into the XPBT 53. As such, the OEM installer 41 must either start to execute after the installer 24 has started, or, if starting beforehand, it must wait for installer 24 to have created the XPBT 53. The agent 28A is saved as agent 28B, and the Oem.exe 42A is saved as Oem.exe 42B. The XPBT install data is used to update the OS registry 62, resulting in the execution of the XPBT binaries, i.e. agent 28B and Oem.exe 42B.

Figure 3:
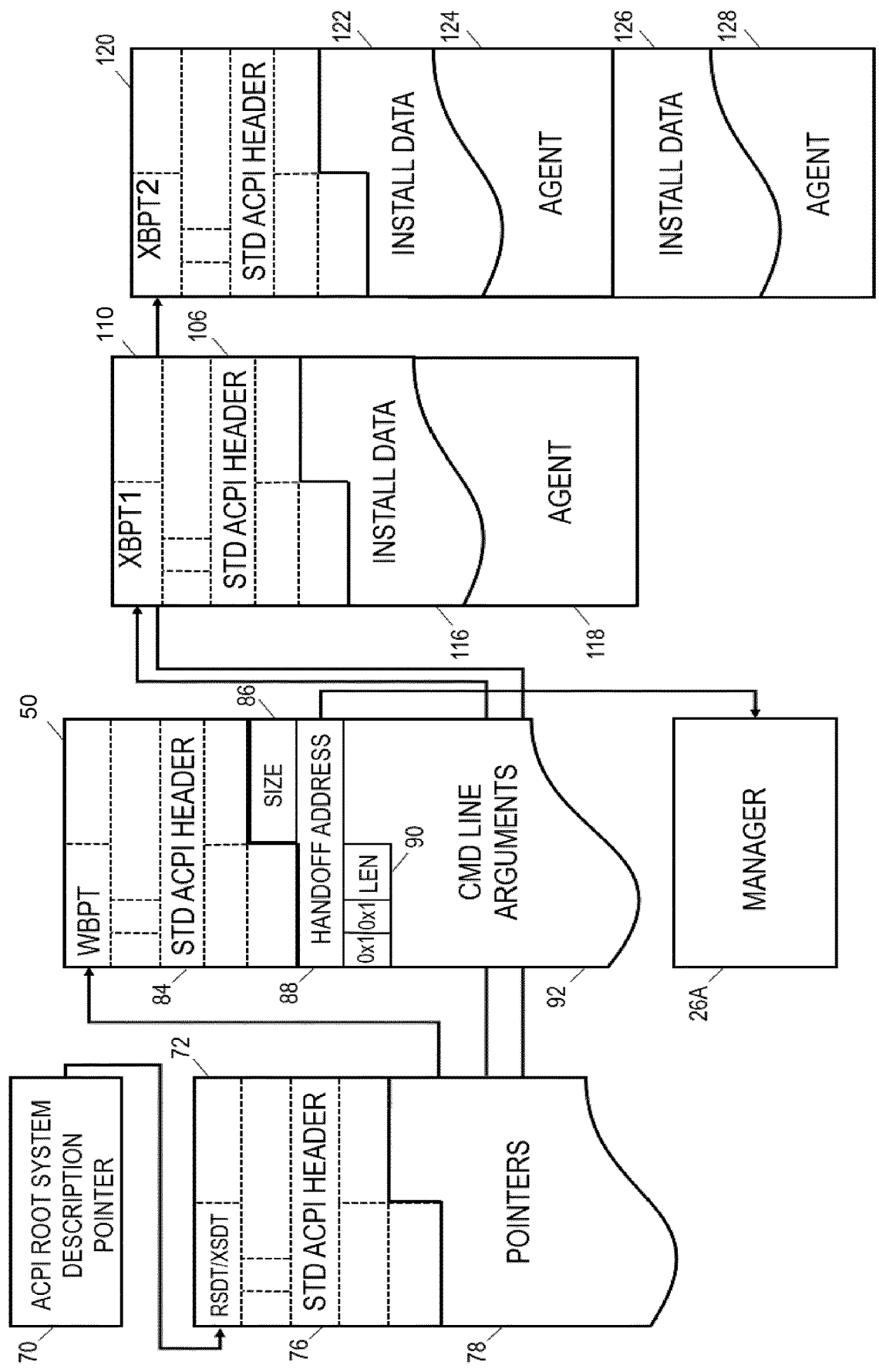
FIG. 3 is a schematic diagram illustrating the data structures of the XPBT and other ACPI tables and their interrelation, according to an embodiment of the present invention.

FIG. 3 illustrates the data structures of the WPBT, XPBT and other ACPI tables. The ACPI root system description pointer 70 points to the RSDT (root system description table) or the XSDT (extended system description table) 72, which includes a standard ACPI header 76 and pointers 78. The pointers 78 point to the ACPI tables, which include a WBPT 50 and one or more differently-named XBPTs 110, 120. The WBPT 50 includes a standard ACPI header 84, a handoff size 86, a handoff address 88, a command length 90 and command line arguments 92 for running the platform extension manager binary image 26B. The handoff address points to the platform extension manager binary image 26A.

There are two examples shown of XPBTs 110, 120. Generally, only XPBT 120 is used as it has multiple nodes, but there may be zero, one or more of each type of table depending on the embodiment implemented. XPBT 110, which has one binary, includes a standard ACPI header 106, install data 116 and a binary image of an agent 118. The install data 116 is used by platform extension manager 26B to launch the corresponding XPBT payload binary 118. The XPBT 120, which is for multiple binaries, includes install data 122, a binary image of an agent 124, further install data 126, and a further binary image of another agent 128.

XPBT install data 116 includes the location where the binary 118 is to be saved and the necessary changes to the registry so that the binary 118 is executed as part of the normal OS boot process. The OS is relied on to verify the signature before the OS executes the binary 118. The payload buffer (e.g. binary image 118) is made to directly follow the XPBT 110, and the table size is adjusted to include the payload buffer. This way the API returns the whole thing, i.e. the table 110 and its corresponding binary image 118.

Likewise, install data 122 includes the location where the binary 124 is to be saved and the necessary changes to the registry so that the binary 124 is executed as part of the normal OS boot process. The same applies to install data 126 and binary 128. The first payload buffer (e.g. binary image 124) is made to directly follow the XPBT 120, the second install data 126 and payload buffer (e.g. binary image 128) are made to directly follow the first payload buffer 124. The table size is adjusted to include the payload buffers. This way the API returns the whole thing, i.e. the table 120 and its corresponding binary images 124, 128.

TABLE 1 shows an example of an XPBT 53. The XPBT entries 53 in the ACPI tables 52 are similar to that of WPBT. Multiple XPBT node entries 54, 56 can exist in the ACPI tables 52. TABLES 1-5 provide a detailed definition of an exemplary XPBT entry. TABLE 2 gives examples of images flags present in the XPBT. TABLE 3 gives example values of the image flag labelled CPU Type. TABLE 4 gives example values of the image flag labelled OS Type. TABLE 4 gives example values of the image flag labelled Image Type.

TABLE 1

| Field | Byte Length | Byte Offset | Description |
| --- | --- | --- | --- |
| ACPI Header | | | |
| Signature | 4 | 0 | 'XPBT' Signature |
| Length | 4 | 4 | Length in bytes |
| Revision | 1 | 8 | 1 |
| Checksum | 1 | 9 | Entire table must sum to zero |
| OEMID | 6 | 10 | OEM ID |
| OEM Table ID | 8 | 16 | The manufacture model ID |
| OEM Revision | 4 | 24 | OEM revision |
| Creator ID | 4 | 28 | Vendor ID of utility that created the table |
| Creator Revision | 4 | 32 | Revision number of utility that created the table |
| XPBT Specific | | | |
| Image Size | 4 | 36 | Binary image size |
| Image Address | 8 | 40 | Address of binary image |
| Image Flags | 2 | 48 | Image Flags (See Table 2) |
| Install Data Len | 2 | 50 | Install data length |
| Install Data | Variable | 52 | Install data |

TABLE 2

| XPBT - Flags | Bit Length | Bit Offset | Description |
| --- | --- | --- | --- |
| Binary Valid | 1 | 0 | Binary Image is valid and should be executed if object type is supported by the OS |
| Reserved | 3 | 1 | |
| CPU Type | 4 | 4 | See Table 3 |
| OS Type | 4 | 8 | See Table 4 |
| Image Type | 4 | 12 | See Table 5 |

TABLE 3

| Flags - CPU Type | Description |
| --- | --- |
| 0 | x86 |
| 1 | x86_64 |
| 2 | Arm Arch32 |
| 3 | Arm Arch64 |
| 4-15 | Reserved |

TABLE 4

| Flags - OS Type | Description |
| --- | --- |
| 0 | Windows |
| 1 | Linux |
| 2 | Android |
| 3 | Mac OS |
| 4 | iOS |
| 5-15 | Reserved |

TABLE 5

| XPBT - Content Type | Description |
| --- | --- |
| 0x01 | PE COFF 32 bit |
| 0x02 | PE COFF 64 bit |
| 0x03 | ELF 32 bit |
| 0x04 | ELF 64 bit |
| 0x05-0x0F | Reserved |

TABLES 1-5 are only an example implementation, to show how multiple binary images can be supported, and other implementations are possible.

Figure 4:
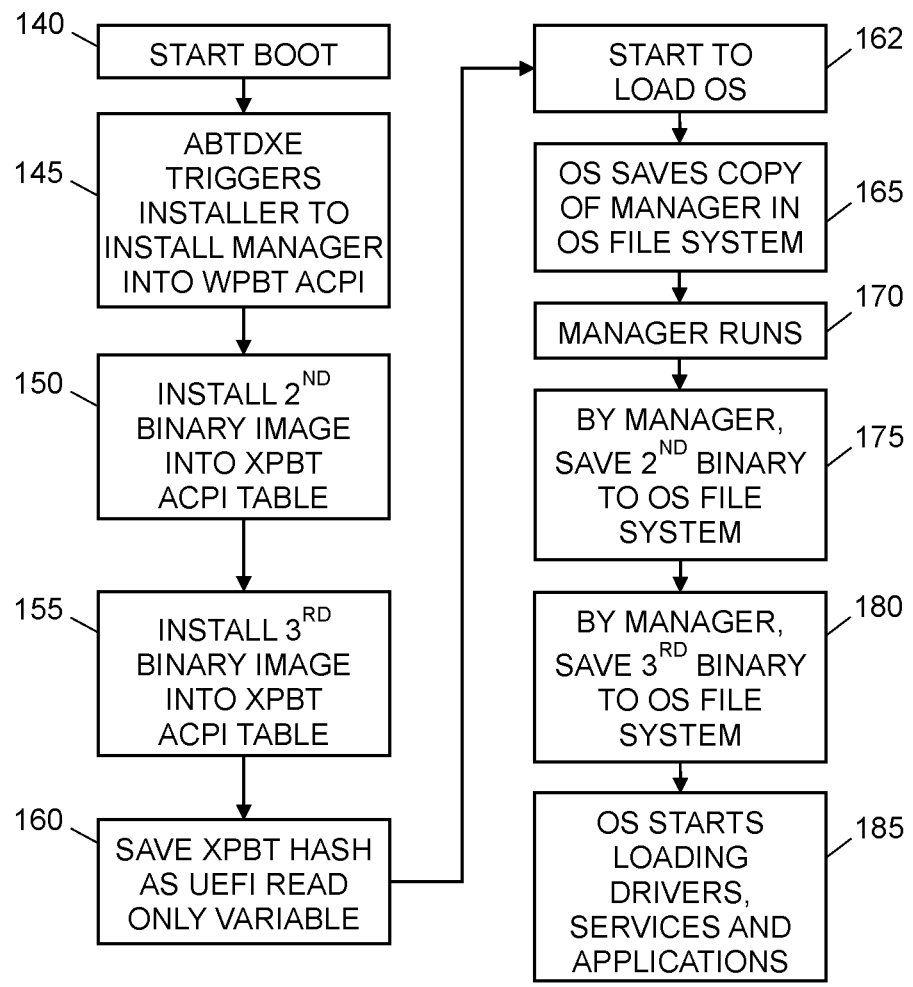
FIG. 4 is flowchart of the steps of a process for publishing multiple binaries, according to an embodiment of the present invention.

Referring to FIG. 4, a process that is undertaken to publish multiple binaries in an electronic device is shown. The process is performed by one or more processors in the electronic device, executing computer-readable instructions that are stored in computer-readable memory in the device. First, the computer or other electronic device is booted, and in step 140, the electronic device starts to boot. In step 145, during the booting process, the firmware of the electronic device installs the first binary image, of a set of multiple binary images, into the ACPI tables. The first binary image is, in this case, the manager image 26, which is installed into the WPBT ACPI table by the installer 24, which is triggered by the AbtDxe driver 22. In step 150, still during the booting process, the firmware installs the second binary image 28 into the ACPI tables. In step 155, and still during the booting process, the firmware installs the third binary image 42 into the ACPI tables.

In step 160, the firmware saves a hash 57 of the binary images as a UEFI read only variable. In step 162, the OS starts to load. In step 165, during loading of the OS, the copy of the manager image 26A that has been installed in the ACPI tables is then saved in the file system of the operating system. At some point, still early in the OS boot process, in step 170, the manager 26B that has been saved to the OS file system is executed. The manager 26B, when executed, saves the second binary 28B to the OS file system in step 175, and saves the third binary 42B to the OS file system in step 180. In step 185, the OS starts loading the drivers, services and applications, and eventually the desktop is ready for display.

As a result, both binaries 28B and 42B are running and have been published from the firmware to the OS.

As described, the XPBT will work with all existing versions of Windows® 8/10 and help provide the transition to an XPBT-only model.

C. Variations

While the invention has been described in relation to ABT and OEM regenerative modules, other modules from other sources may be used, provided that they function in a similar way.

The XPBT signature and XPBT ACPI table layout is implementation specific. The XPBT signature could be anything as long as the platform extension manager knows what to search for. The XPBT layout could be anything as long as the platform extension manager knows how to parse it. The ACPI signature in other embodiments is therefore different from XPBT with the table layout defined in relation to TABLE 1.

The overall goal is to support loading multiple binary images from the ACPI tables. This is accomplished by having multiple binary images in an XPBT, or having multiple XPBT tables with one image each, or a combination of the two, i.e. multiple XPBT tables with one or more binary images in each table.

Other configuration tables instead of ACPI tables may be used in other embodiments.

The binary image payloads can be services, applications or drivers.

It is also conceivable that the invention may be embodied in relation to other operating systems, i.e. it is possible to make the XPBT specification OS agnostic and support other OS types in addition to Windows®.

The invention claimed is:

1. A method for publishing multiple binary images from firmware in an electronic device to an operating system in the electronic device, the method comprising:
   during booting of the electronic device, the steps of:
      installing a first binary image, which is stored in the firmware, into a configuration table in the electronic device;
      installing a second binary image, which is stored in the firmware, into the configuration table; and
      saving a copy of the first binary image in a file system of the operating system; and
   after the operating system has started loading, the step of executing the copy of the first binary image to:
      save a copy of the second binary image in the file system; and
      copy a third binary image from the configuration table to the file system.

2. The method of claim 1, comprising installing the third binary image, which is stored in the firmware, into the configuration table.

3. The method of claim 1, wherein the copy of the first binary image, when executed, performs the steps of:
   searching through the configuration table to find the second and third binary images; and
   checking integrity of the second and third binary images;

before the steps of saving the copy of the second binary image in the file system and copying the third binary image from the configuration table to the file system.

4. The method of claim 1 comprising:
calculating a hash of the second and third binary images in the configuration table;
storing the hash in a read-only UEFI (Unified Extensible Firmware Interface) variable; and
checking, by the copy of the first binary image, the second and third binary images for integrity by accessing the hash.

5. The method of claim 1, wherein:
the second and third binary images are provided by different entities; and
the configuration table is an Advanced Configuration and Power Interface table.

6. The method of claim 1, wherein:
the first binary image is installed into a specific operating system platform binary table within the configuration table; and
the second and third binary images are both installed as nodes in a common platform binary table within the configuration table.

7. The method of claim 1, wherein the copy of the first binary image, when executed, performs the step of:
changing a registry in the operating system so that the second and third binary images are automatically executed after the operating system has loaded.

8. An electronic device that publishes multiple binary images, the electronic device comprising:
a processor;
an operating system; and
firmware storing computer readable instructions, which, when executed by the processor cause the electronic device, during booting of the electronic device, to:
install a first binary image, which is stored in the firmware, into a configuration table in the electronic device;
install a second binary image, which is stored in the firmware, into the configuration table;
install a third binary image, which is stored in the firmware, into the configuration table; and
save a copy of the first binary image in a file system of the operating system; and, after the operating system has started loading, cause the electronic device to execute the copy of the first binary image and thereby:
save a copy of the second binary image in the file system; and
save a copy of the third binary image in the file system.

9. The electronic device of claim 8, wherein the configuration table is an Advanced Configuration and Power Interface table.

10. The electronic device of claim 8, wherein:
the first binary image is installed into a specific operating system platform binary table within the configuration table;
the second and third binary images are each installed into separate individual platform binary tables within the configuration table.

11. A non-transitory computer readable media comprising computer readable instructions, which, when executed by a processor in an electronic device that has firmware, cause the electronic device, during booting of the electronic device, to:
install a first binary image, which is stored in the firmware, into a configuration table in the electronic device;
install a second binary image, which is stored in the firmware, into the configuration table;
install a third binary image, which is stored in the firmware, into the configuration table;
save a copy of the first binary image in a file system of an operating system of the electronic device; and,
cause the electronic device to execute the copy of the first binary image and thereby:
save a copy of the second binary image in the file system; and
save a copy of the third binary image in the file system.

\* \* \* \* \*